(12) United States Patent  
Layne et al.

(10) Patent No.: US 7,441,649 B2
(45) Date of Patent: Oct. 28, 2008

(54) SIDE-FLEXING CONVEYOR CHAIN HAVING TWIN TRANSVERSE CONNECTORS

(75) Inventors: James L. Layne, Bowling Green, KY (US); Michael D. McDaniel, Glasgow, KY (US)

(73) Assignee: Span Tech, LLC, Glasgow, KY (US)

( * ) Notice: Subject to any disclaimer, the term of this patent is extended or adjusted under 35 U.S.C. 154(b) by 0 days.

(21) Appl. No.: 11/472,027

(22) Filed: Jun. 21, 2006

(65) Prior Publication Data

US 2006/0249352 A1 Nov. 9, 2006

Related U.S. Application Data

(63) Continuation of application No. 10/732,141, filed on Dec. 10, 2003, now Pat. No. 7,108,126.

(51) Int. Cl.
    *B65G 17/06* (2006.01)
(52) U.S. Cl. ............... 198/852; 198/850; 198/844.1
(58) Field of Classification Search ......... 198/848–853, 198/844.1
    See application file for complete search history.

(56) References Cited

U.S. PATENT DOCUMENTS

| 5,265,715 A | * | 11/1993 | Yoshimura et al. | .......... 198/848 |
| 5,954,188 A | | 9/1999 | Etherington et al. | |
| 6,070,715 A | | 6/2000 | Etherington et al. | |
| 6,195,868 B1 | | 3/2001 | Etherington et al. | |
| 6,371,284 B1 | * | 4/2002 | Pasch | .......... 198/848 |
| 6,578,704 B1 | * | 6/2003 | MacLachlan | .......... 198/778 |
| 6,615,979 B2 | * | 9/2003 | Etherington et al. | .......... 198/851 |

* cited by examiner

*Primary Examiner*—Mark A Deuble
(74) *Attorney, Agent, or Firm*—King & Schickli, PLLC

(57) ABSTRACT

An improved conveyor chain formed from a plurality of modular links arranged in rows and each associated with at least two elongated transverse connectors is disclosed. In one embodiment, the connectors together create a substantially open, planar support surface intermediate of the links in each row. Each link in a first row includes apertures for receiving a first of the connectors extending through a slot in the links of an adjacent row, as well as a receiver having a closed end and an open end for receiving one end of a second one of the connectors. The chain with the connectors associated with each row is thus capable of side-flexing to negotiate curves or bends, as well as longitudinal compression/expansion, while at all times providing full and even article support.

22 Claims, 8 Drawing Sheets

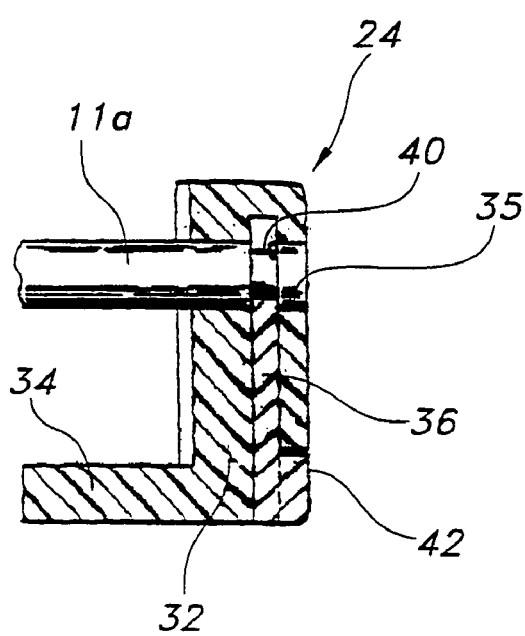
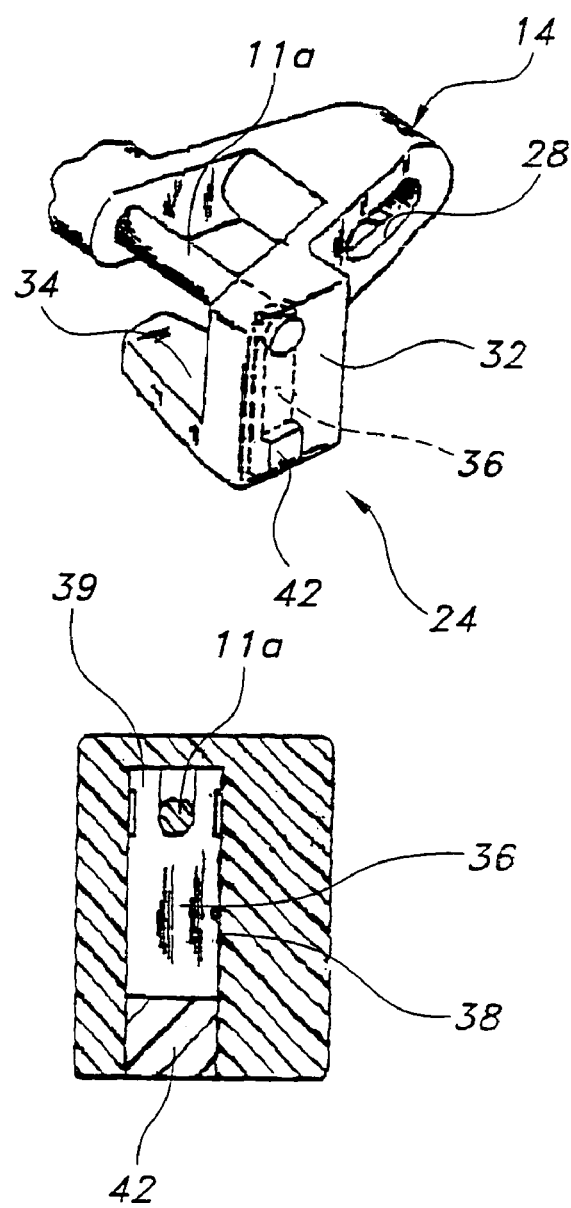
FIG. 5
FIG. 5A
FIG. 5B

SIDE-FLEXING CONVEYOR CHAIN HAVING TWIN TRANSVERSE CONNECTORS

This is a continuation of U.S. patent application Ser. No. 10/732,141, filed Dec. 10, 2003 now U.S. Pat. No. 7,108,126.

TECHNICAL FIELD

The present invention relates generally to the conveyor art and, more particularly, to a side-flexing conveyor chain with twin transverse connectors.

BACKGROUND OF THE INVENTION

Conveyor systems are an integral part of modem production facilities. Such systems are especially beneficial in the food processing and article packaging industries, where it is often desirable to move articles to and from different areas of the production facility to undergo various manufacturing/packaging operations. For example, many food manufactures require transportation of food items from a baking area to a position for final packaging. However, many of these items, such as breads and other baked goods require cooling prior to packaging. Additionally, these food products are often soft and fragile, thereby requiring special care during transportation through the production facility to avoid damage.

In this regard, conveyor chains with rows of laterally repeating modular links create a substantially closed conveying surface are perhaps the most popular on the market today. Such a closed surface does not, however, allow the maximum amount of airflow to reach the underside of the articles being conveyed, which can be deleterious for items such as baked goods being packaged at a downstream location. Moreover, the closed surface also hinders the ability of dislocated crumbs or bits of debris to pass through the conveyor chain for collection, such to an underguard assembly (see, e.g., commonly assigned U.S. Pat. No. 6,000,529 to Layne et al.) or to the floor for sweeping away.

In an attempt to remedy this problem, others have proposed chain conveyors with a pair of transverse rods extending the entire width of the conveyor chain between each corresponding pair of side links. An example is shown in FIG. 1. Although the conveying surface is indeed open, the spacing of the transverse rods may not provide adequate support for smaller items being conveyed.

Additionally, many production facilities also have limited floor space, thereby making efficient use of the space available imperative. Thus, manufacturers are increasingly desirous of conveyor systems occupying as small an area as possible. To do so, the conveyor chain must have the capability to move product smoothly around curves, as well as along extended runs.

Accordingly, a need is identified for a conveyor chain with a substantially open conveying surface capable of providing full support for any articles being conveyed, including smaller ones that might normally pass through or become caught within an open conveying surface created by spaced connectors associated with adjacent rows of links. The conveyor chain would also be capable of negotiating turns or bends, and thus would allow for a possible savings in the amount of floor space occupied in the production facility. Overall, a substantial improvement in terms of efficiency and operator satisfaction would result, especially when used in conveyed baked goods.

SUMMARY OF THE INVENTION

In accordance with one aspect of the invention, a side-flexing modular link conveyor chain comprises a plurality of links arranged in rows spaced apart in a conveying direction. The links in at least a first row include apertures and the links in at least a second row include slots for aligning with the apertures when interdigitated with the links in the first row. A first elongated connector is associated with the slots and the apertures to interconnect the first and second rows of links and has a dimension A in a direction transverse to the conveying direction. A second elongated connector extending between the links in the first row has a dimension B in the transverse direction. The dimension A is greater than B, and may be greater than two times B.

In one embodiment, each link in the first row includes a receiver for receiving an end of the second connector. The receiver includes an open end and a closed end. Furthermore, each link in the first row comprises an apex portion including the slot, a pair of outwardly divergent leg portions, a foot portion associated with each leg portion, and an arm portion including the receiver. Each link may further comprise a plurality of apex portions, a plurality of pairs of leg portions, and a plurality of foot portions.

Each link in the second row comprises an apex portion, a pair of outwardly divergent leg portions including the apertures, and a foot portion associated with each leg portion. Moreover, each link in the second row may include an arm portion. A receiver for receiving a third transverse connector may be associated with the arm portion of each link.

In one embodiment, the links in each row are characterized by the inclusion of a depending arm having an inwardly extending tab for assisting in guiding the chain relative to a guide rail. The depending arm on each link in the first row includes an opening for receiving a locking tab for retaining the first connector in place. In any case, the first and second connectors at least partially define a conveying surface of the chain intermediate the links in each row.

In accordance with a second aspect of the invention, a modular link conveyor chain is disclosed. The chain comprises a plurality of links arranged in rows spaced apart in a conveying direction. The links in at least a first row include first and second spaced apertures and the links in at least a second row include slots for aligning with the first apertures when interdigitated with the links in the first row. A first connector associated with the slots and the first apertures interconnects the first and second rows of links, while a second connector extends at least between the links in the first row and is spaced from the first connector. A third connector is associated with the second apertures of the first row of links.

In one embodiment, the second apertures in the first row of links are slots. The third connector may pass through third apertures formed in the links of a third row and the slots of the first row of links. The first connector preferably has a dimension A in the transverse direction, the second connector has a dimension B, and A>B. The third connector may have dimension C wherein A is substantially equal to C.

In accordance with a third aspect of the invention, a modular link conveyor chain is disclosed. The chain comprises first and second modular links, each including at least one apex portion, a foot portion, a pair of leg portions connecting the apex portion with the foot portion, and an arm portion projecting outwardly from the foot portion and including a receiver having an open end and a closed end. A first connector interconnects the foot portions of the first and second links, and a second connector includes a first end positioned in the open end of the receiver of the first link and a second end positioned in the open end of the receiver of the second link.

In one embodiment, each modular link includes a plurality of apex portions. Each of the plurality of apex portions may be associated with a pair of leg portions. Indeed, at least one of the leg portions associated with a first apex portion may join a common foot portion with at least one of the leg portions of an adjacent second apex portion. Preferably, the first and second connectors are substantially parallel.

In accordance with a third aspect of the invention, a modular link for a conveyor chain is disclosed. The link comprises an apex portion having a pair of leg portions extending therefrom. The apex portion includes a first aperture passing transversely therethrough. The leg portions each terminate in a foot portion, each including a second aperture passing transversely therethrough. At least one arm portion projects from one of the foot portions and includes a receiver having an open end and a closed end.

In one embodiment, a second arm portion is connected to another of the foot portions and includes a receiver. Preferably, the arm portions are outwardly divergent. The receiver may be spaced from both the first aperture and the second apertures in a conveying direction when mounted in the chain.

The first aperture may be an elongated slot, and a plurality of apex portions may be provided, with each including a pair of leg portions extending therefrom. A first leg portion associated with a first apex portion is connected to the same foot portion as a second leg portion associated with a second apex portion.

In accordance with a fourth aspect of the invention, a modular link for a conveyor chain having a conveying direction is disclosed. The chain comprises an apex portion having a pair of leg portions extending therefrom. The apex portion includes a first aperture passing transversely therethrough and the leg portions each terminate in a foot portion. Each foot portion includes a second aperture passing transversely therethrough. At least one arm portion projects from one of the foot portions and includes a receiver. The receiver is spaced from both the first aperture and the second apertures in the conveying direction when mounted in the chain, and the first and second apertures and the receiver are preferably substantially coplanar.

BRIEF DESCRIPTION OF THE DRAWINGS

The accompanying drawings incorporated in and forming a part of the specification, illustrate several aspects of the present invention, and together with the description serve to explain the principles of the invention.

In the drawings:

FIGS. 5, 5a, and 5b show the manner in which a locking tab may be used to retain a connector associated with the links of a single row;

FIG. 6a is a top view illustrating the manner in which the chain is capable of expansion and compression in the longitudinal or conveying direction;

DETAILED DESCRIPTION OF THE INVENTION

Figure 2:
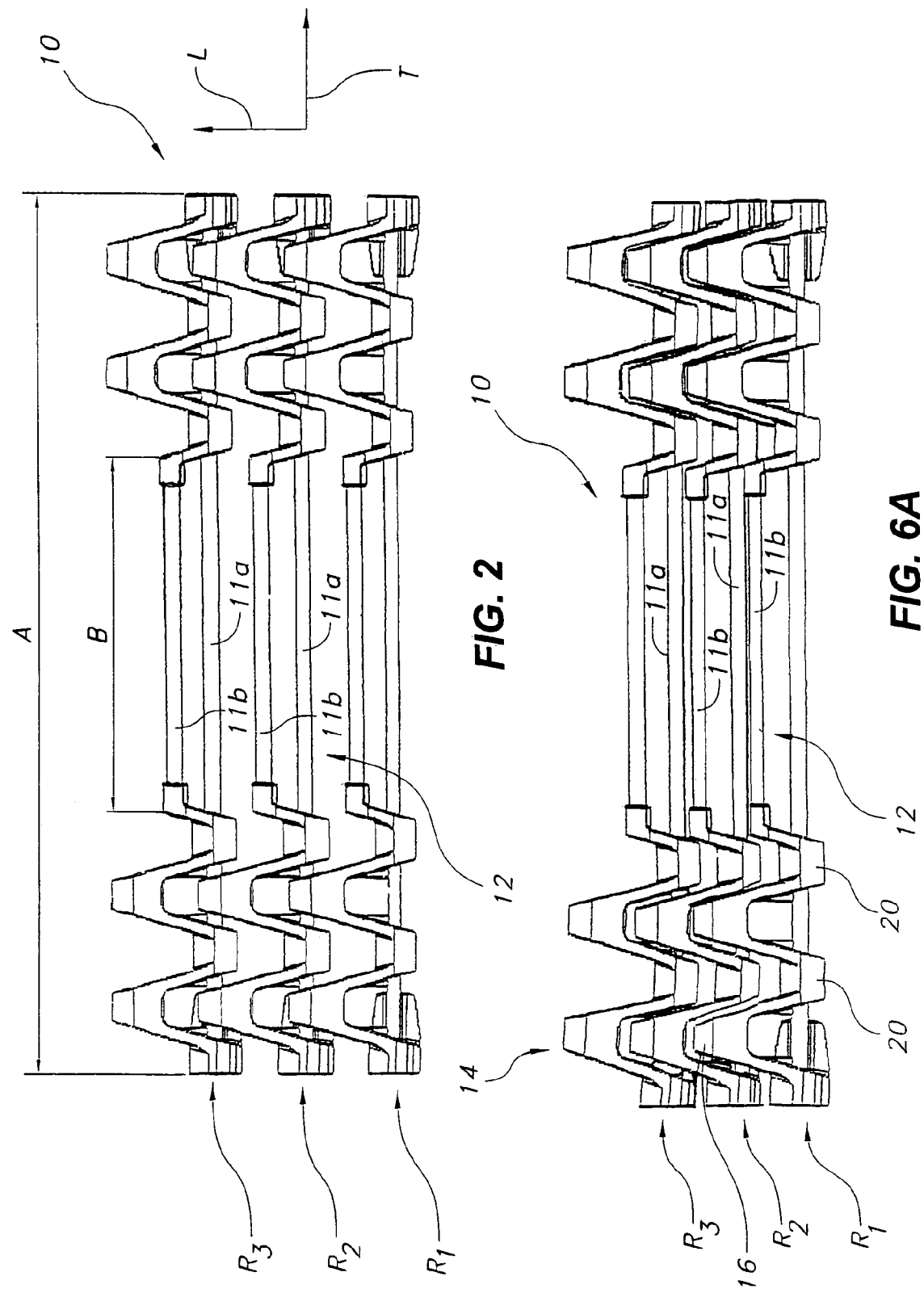
FIG. 2 is a top view of one embodiment of a conveyor chain forming part of the present invention.

Reference is now made to FIG. 2, which illustrates one embodiment of the conveyor chain 10 of the present invention. The chain 10 is formed by a plurality of interconnected modular links 14 arranged in rows (three shown, $R_1$, $R_2$, and $R_3$). The links 14 are spaced apart in both the conveying direction (see action arrow L) and a direction transverse to the conveying direction (action arrow T). Each pair of laterally spaced links 14 is associated with at least two elongated, transversely extending connectors 11a, 11b, one of which is shorter than the other in the transverse direction (note dimensions A of the first connector 11a and B of the second connector 11b, such that A is at least greater than B (i.e., A>B) and, more preferably, A is greater than at least two times B (i.e., A>2B). As outlined further in the description that follows, the connectors 11a, 11b provide the often desirable substantially open conveying surface 12, yet one capable of providing full, even support, including for articles having a relatively small dimension in the conveying direction L.

Figure 3:
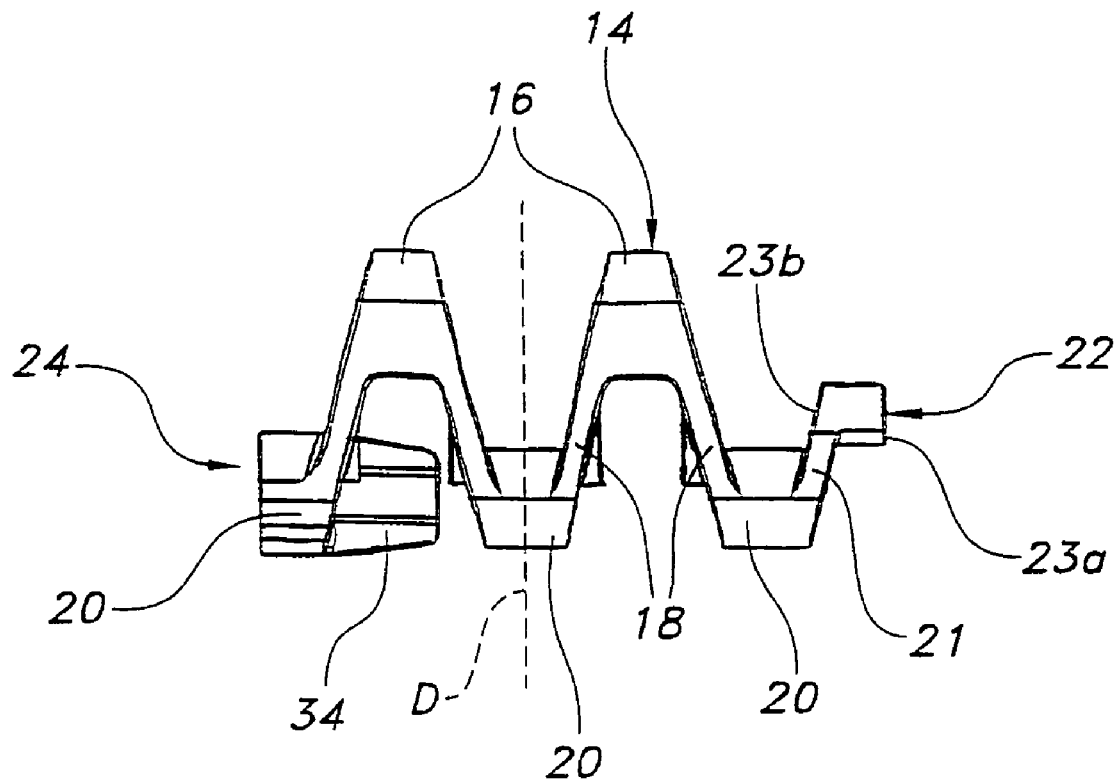
FIG. 3 is a top view of one link used in the chain of FIG. 2.

Referring now to FIG. 3 to more fully describe the links 14 used in the embodiment of the chain 10 shown in FIG. 2, it includes a plurality of laterally repeating sections, each having an apex portion 16. A pair of leg portions 18 extend or project from each apex portion 16, preferably in an outwardly diverging relationship. Consequently, a single laterally repeating section of the link 14 in this embodiment is substantially V-shaped in plan view, which of course means that a pair of the sections are substantially W-shaped. As should be appreciated, the upper surfaces of the apex portion 16 and leg portions 18 are adapted for engaging and supporting articles for conveyance.

Figure 1:
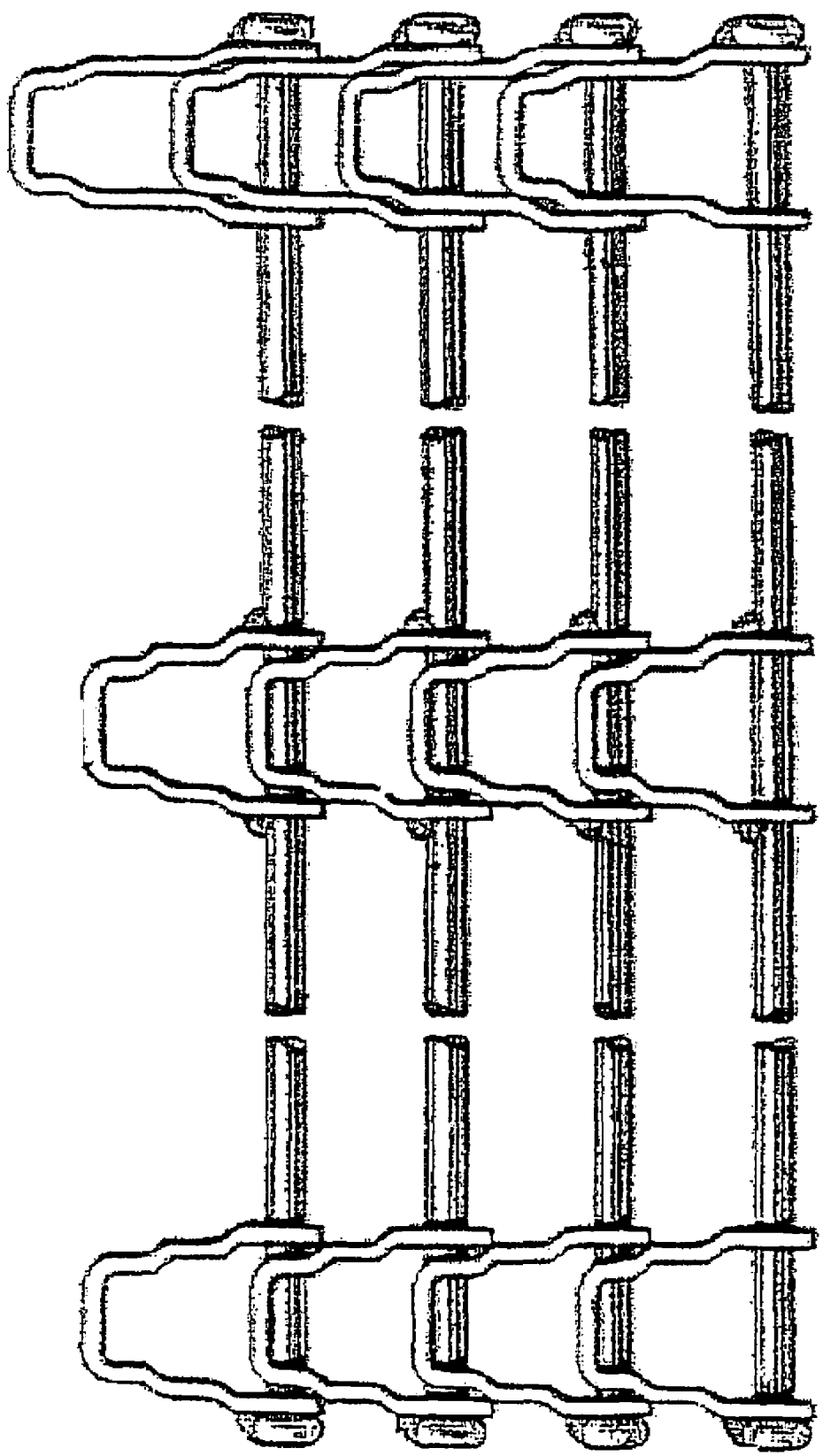
FIG. 1 is a top view of a prior art conveyor chain.

Each leg portion 18 is also associated with a foot portion 20. The foot portion 20 is typically barrel shaped, and may include an upper surface defining a surface capable of engaging and conveying articles. In the usual arrangement, and although a chain 10 formed of links 14 of this type is fully reversible, the apex portions 16 define the leading end of the link 14 and the foot portions 20 define the trailing end. In other words, the chain 10 is normally driven along an endless path in the direction of action arrow L in FIG. 1, but can be driven in the other direction as well.

Referring now to FIGS. 4, 5, 5a, and 5b, each apex portion 16 provided in the link 14 includes a first opening or aperture in the form of an elongated slot 28. Furthermore, the foot portion 20 of each leg portion 18 includes a second opening or aperture, such as a hole 30. The holes 30 of adjacent foot portions 20 are thus coaxial, as are the slots 28 when multiple apex portions 16 are provided (as is the case in FIGS. 2-5).

As is shown in FIG. 2, when two links 14 spaced in the conveying direction L along each side of the chain 10 are interdigitated, the first connector 11a passes through the slot 28 in each apex portion 16 and the hole 30 in each foot portion 20. Consequently, the links 14 in adjacent rows $R_1$, $R_2$ are interconnected with each other in such a relationship. As discussed further below, the longitudinal freedom of the connector 11a in the slot 28 is desirable, since it allows relative movement among the rows $R_1$, $R_2$ of links 14 to take place and permits the chain to side flex as well as to expand and compress.

To hold the first connector 11a in this position, it is retained in the outer side portion of each link 14. In one embodiment, as shown in FIGS. 5, 5a, and 5b, this is accomplished by providing the outermost foot portion, or side portion 24, of each link 14 with a depending arm portion 32 having a hole 35 co-axial with the hole 30 of each foot portion 20. The hole 35 receives the first connector 11a, and an integral locking tab 36 is inserted within a slot 38 formed in the link 14. As shown in FIGS. 5a and 5b, the locking tab 36 may include prongs 39 to engage a corresponding circumferential notch 40 provided at each end of the first connector 11a. In the preferred embodiment, the locking tab 36 is fabricated from a resilient or flexible material, such as nylon. This construction allows the prongs 39 of the tab 36 to snap lock in the notch 40 for secure engagement and further allows the locking tab 36 to be easily installed and removed.

The locking tab 36 also includes an offset release button 42 seated in an open-ended portion of the slot 38. The button 42 of locking tab 36 assists in the installation and removal of the locking tab 36 from the side portion 24 when, for example, maintenance and repair is required. More specifically, a blade tool, such as a screwdriver, is tapped against the button to initiate prying action. Once sufficient movement is initiated, the screwdriver then provides increased leverage to facilitate removal of the tab 36. The inherent resiliency of the tab 36 allows the prongs 39 to disengage from the notch 40. To reinsert the tab 36, the prongs 39 are directed into the slot 38. It can be appreciated that the resiliency of the tab 36 allows the prongs 39 to snap around the notch 40. Thus, secure retention of the connector 1 a results.

In accordance with one aspect of the invention, each link 14 further includes an additional extension for associating with the second connector 11b. In one embodiment, this extension is in the form of a second arm portion 21 projecting or extending from the innermost foot portion 20 of each link 14. The arm portion 21 preferably projects inwardly from each link 14, and includes a receiver adapted for receiving one end of the second connector 11b. In the preferred embodiment, this receiver is in the form of a "blind" pocket 22 having an open end 23a and a closed end 23b (see FIG. 3).

Figure 4:
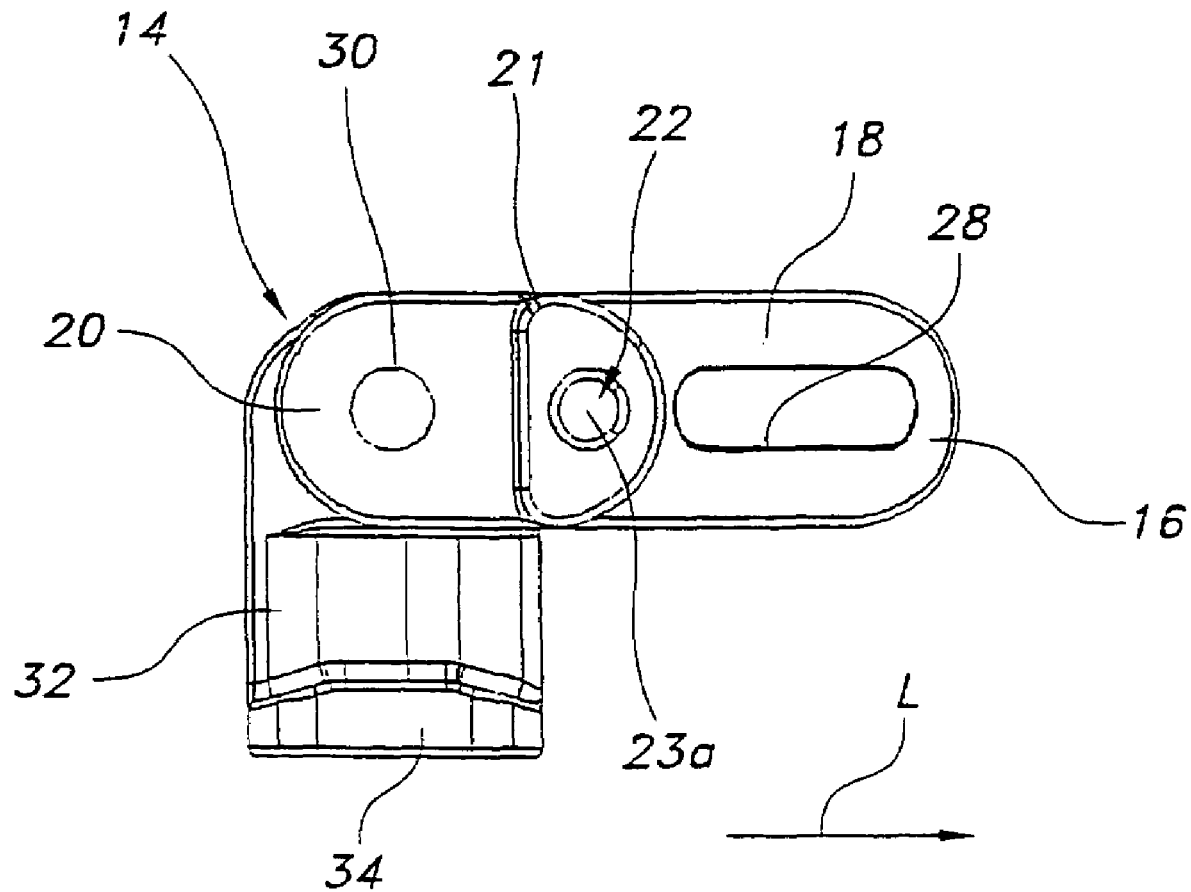
FIG. 4 is a side elevational view of the link of FIG. 3.

As perhaps best understood with reference to FIG. 4, the pocket 22 is preferably formed in an end of the arm portion 21 having a generally D-shaped cross section such that a rounded leading face is provided. This end of the arm portion 21 is positioned such that the pocket 22 is spaced in the conveying direction L from both the slot 28 in each apex portion 16 and the hole 30 in each foot portion 20. The receiver or pocket 22, the slot 28, and the holes 30 of each link 14 are preferably substantially coplanar to create a planar conveying surface 12 (but not necessarily one coplanar with the upper surfaces of the apex portion 16, leg portions 18, and foot portions 20).

The pocket 22 also preferably matches the end of the second connector 11b in shape, such that free relative rotation is permitted. However, it is also possible to fix the connector 11b against rotation. For example, this may be accomplished by providing the second connector 11b with a key and forming a corresponding keyway in the pocket 22 (not shown), or vice versa.

Regardless of the particular arrangement, the first and second connectors 11a, 11b are in the usual situation substantially parallel to one another and, as seen in FIG. 2, arranged in a repeating pattern to define the substantially open conveying surface 12 between the laterally spaced side links 14. This conveying surface 12 promotes cooling of products being conveyed (e.g., book bindings, baked goods, frozen items, etc.) and allows debris, such as crumbs, to fall through the conveyor chain 10 for collection. The open nature of this surface 12 also greatly facilitates cleaning without compromising the requirement for providing full and even support, including for small articles.

From the foregoing description, it should be appreciated from that a chain 10 constructed as described above is capable of undergoing longitudinal expansion and compression, as well as side-flexing to negotiate curves or bends. In the former case, and with specific reference to FIG. 6a, the links 14 forming two adjacent rows, such as trailing row $R_1$ and leading row $R_2$, can move toward and away from each other. This is the result of the freedom of movement of the first connector 11a associated with the hole 30 in each foot portion 20 of a leading row $R_2$ of links 14 in the slot 28 formed in each apex portion 16 of the trailing row $R_1$. In addition to possibly eliminating the need for a catenary, the first connector 11a of the leading row $R_2$ also acts to close any gap with the second connector 11b of the trailing row $R_1$. As noted above, the terminus of the slot 28 in each apex portion 16 is spaced from the pocket 22 in the conveying direction L so that no interference between the first and second connectors 11a, 11b of adjacent rows $R_1$, $R_2$ results during any such movement. Substantially smooth and effective compression and expansion thus results, which may be controlled by adjusting the speed at which the chain 10 is driven (such as by using a variable speed electric motor to drive a shaft carrying sprockets for engaging the links 14).

Figure 6B:
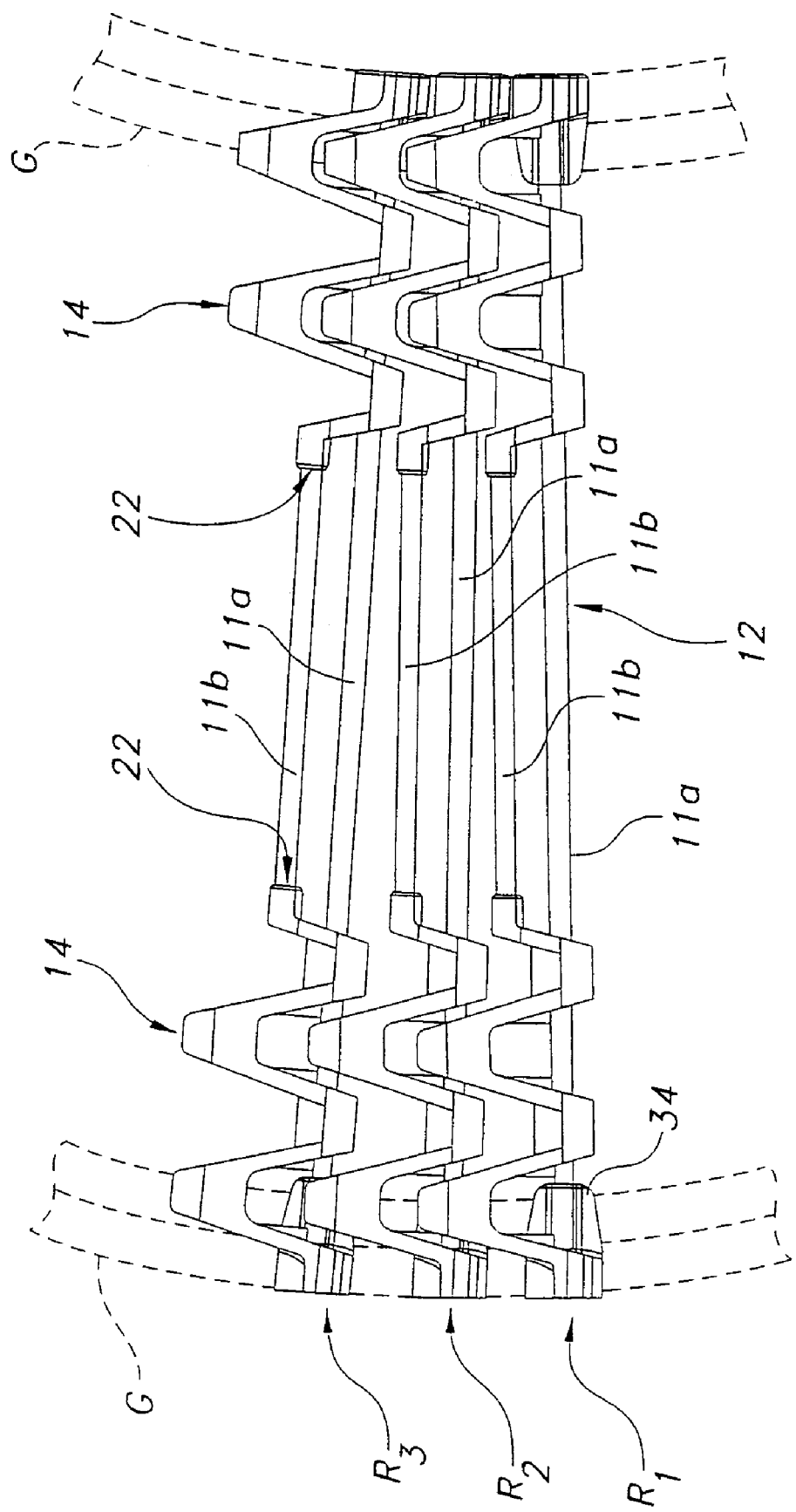
FIG. 6b is a top view showing how the chain of FIG. 6a can also side flex to negotiate curves or bends when negotiating a curve or bend defined by a pair of spaced guide rails.

Likewise, FIG. 6b shows how the chain 10 constructed as set forth above can undergo side-flexing as a result of the provision of a slot 28 in each apex portion 20, with the first connector 11a associated with a first row $R_2$ of links 14 again moving toward and away from the second connector 11b of the adjacent second row $R_1$. However, during side flexing, it is of course the situation that one end of this second connector 11b moves closer to this first connector 11a than the other, which moves farther away as the result of the expansion of the links 14 along the outside of a curve. In the usual case, the connectors 11a, 11b remain unable to contact one another as a result of the relative spacing of the pocket 22 and the slot 28 (see FIG. 4).

To assist in guiding the chain 10, and with reference back to FIGS. 5, 5a, and 5b, each link 14 may further include an inwardly projecting guide tab 34 associated with each depending arm 32. The guide tab 34 captures the link 14 on the adjacent guide structure G and helps to prevent undesirable tenting. The tab 34 also assists in supporting the chain 10 when inverted along a return run forming part of the endless path. As shown in FIG. 5, the engagement surfaces of both the depending arm 32 and tab 34 may be tapered to reduce the incidence of binding.

Figure 7:
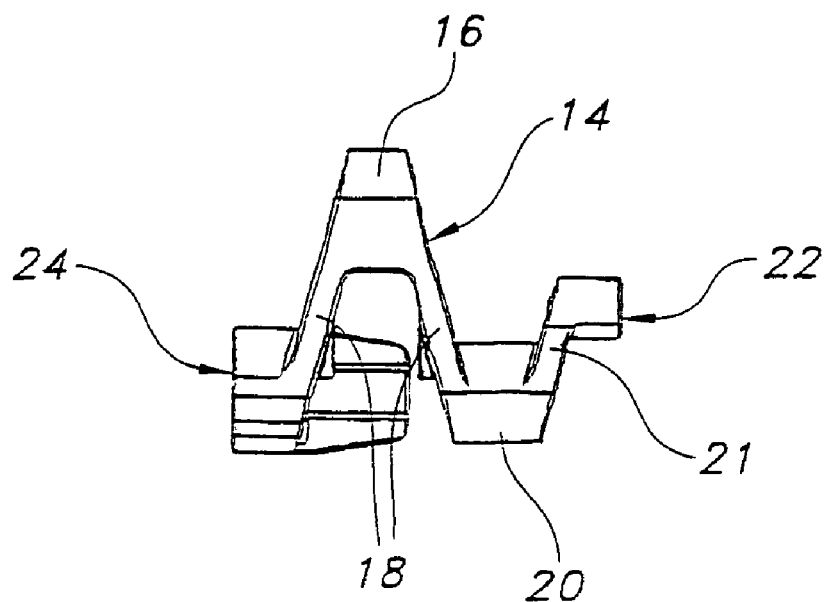
FIG. 7 is a top view of an alternative embodiment of the link of FIGS. 2-4.

Referring now to FIG. 7, an alternative embodiment of the link 14 is shown. In this embodiment, only a single apex portion 16 is provided. This apex portion 16 is associated with two leg portions 18, one of which is associated with a foot portion 20 also defining the side portion 24 of the link 14 and the other of which is associated with a second foot portion 20. This second foot portion 20 is in turn connected with the arm portion 21 having the receiver, or pocket 22, at one end. This link 14 is thus fully able to accommodate both the first and second connectors 11a, 11b as described above, as well as the first connector of an adjacent row of links (which passes through the slot (not shown, but see FIG. 4) in the single apex portion 16).

With reference back to FIG. 3, it is also possible to form a similar link 14 without the depending arm 32 and inwardly projecting tab 34, as indicated by the dashed line D in FIG. 3. Such a link 14 may be associated with a separate side guide link (not numbered) forming the portion to the left of line D.

An example of such a guide link is described in commonly assigned U.S. Pat. No. 4,953,693, the disclosure of which is incorporated herein by reference, and is essentially shown in FIG. 5.

Figure 8:
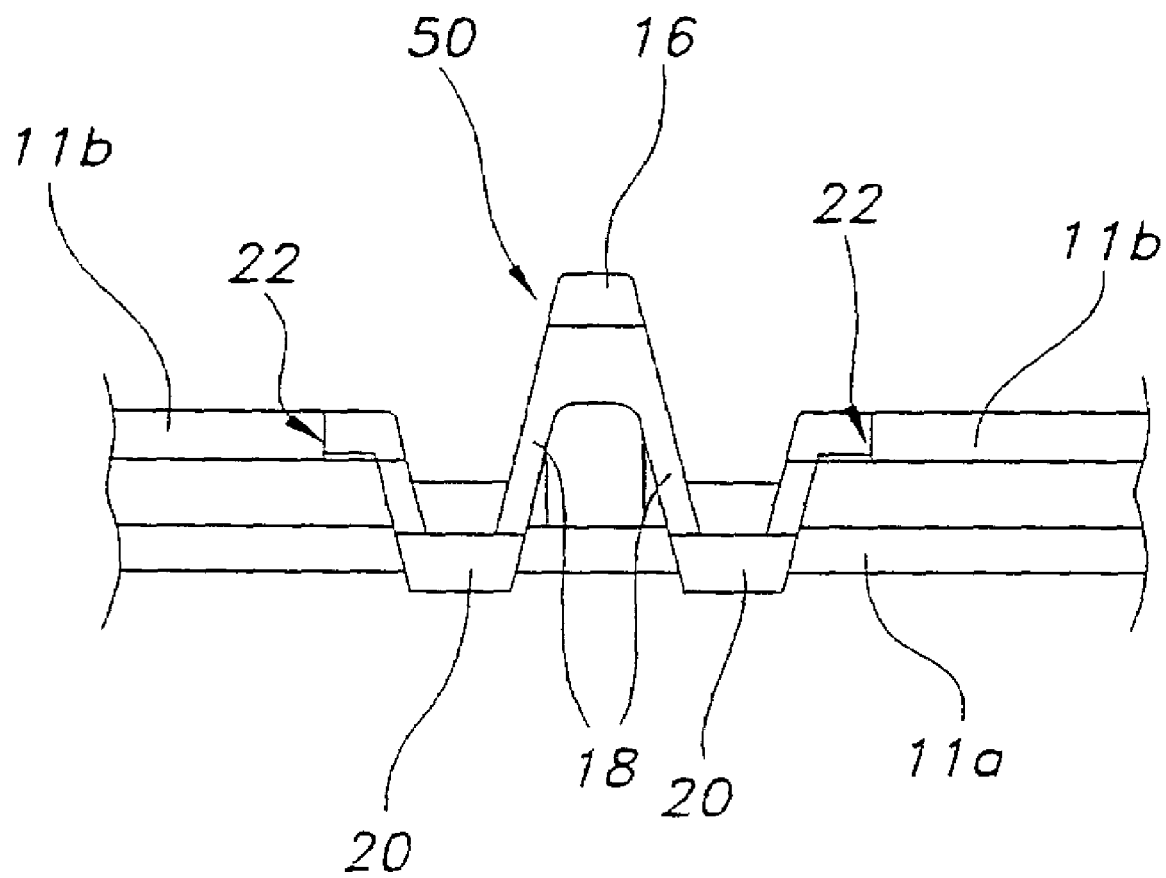
FIG. 8 is a top view of another alternative embodiment of a link for use in the chain forming one aspect of the present invention.

In situations where a particularly wide chain is desired, it may be desirable to provide support for the first and second connectors 11a, 11b between the side links 14. To do so, an intermediate link 50 may be used, an example of which is shown in FIG. 8. The intermediate link 50 includes at least one apex portion 16 having a slot (not shown), a pair of leg portions 18, and a foot portion 20 associated with each leg portion. An arm portion 21 projects outwardly from each foot portion 20 and includes the receiver or pocket 22. Thus, a "second" connector 11b may be received in each pocket 22, while the first or regular connector 11a extending between the links 14 passes through the foot portions 20, as previously described. More than one apex portion 16 may of course be provided, with a corresponding number of leg portions 18 and foot portions 20 also being present.

The links 14 may be formed of any durable material, with UHMW polyethylene, polypropylene or Acetal being preferred choices because of the high durability, relatively low weight, and low cost of such materials. The first and second connectors 11a, 11b are preferably fabricated from stainless steel. Using these materials results in a substantially strong chain 10, and one that is not prone to oxidation and rust. However, the connectors 11a, 11b and links 14 may be formed of any material, including metal or other polymers.

Of course, the dimension B should exceed the distance between the open ends 23a of the pockets 22 to ensure that the second connector 11b remains captured in use (see FIG. 2). In making the chain 10 when the first connector 11a is already locked in place, the arm portions 21 of each link 14 may be flexed slightly to allow for insertion of the end of this connector 11b. Alternatively, the second connector 11b may be positioned in the pockets 22 before the first connector 11a is installed.

In summary, a conveyor chain 10 having a substantially open conveying surface for facilitating the cooling of products and the passage of debris while providing full and even support during conveyance is disclosed. To do so, three connectors (i.e., a first connector 11a passing through the hole 30 in each foot portion 20 of a trailing row $R_1$ of links 14, a second connector 11b extending between the links 14 of that row, and another "first" connector 11a passing through a slot 28 in each apex portion of the links 14 in the trailing row $R_1$ and interconnecting with the links 14 of a leading row $R_2$) are associated with interconnected rows $R_1$, $R_2$ of links 14. The resulting chain 10 is thus readily adapted for conveying articles, such as baked goods. The ability of the chain 10 to side flex to negotiate curves or bends saves floor space, while the ability to compress and expand in the longitudinal direction eliminates the need for a catenary.

Figure 9:
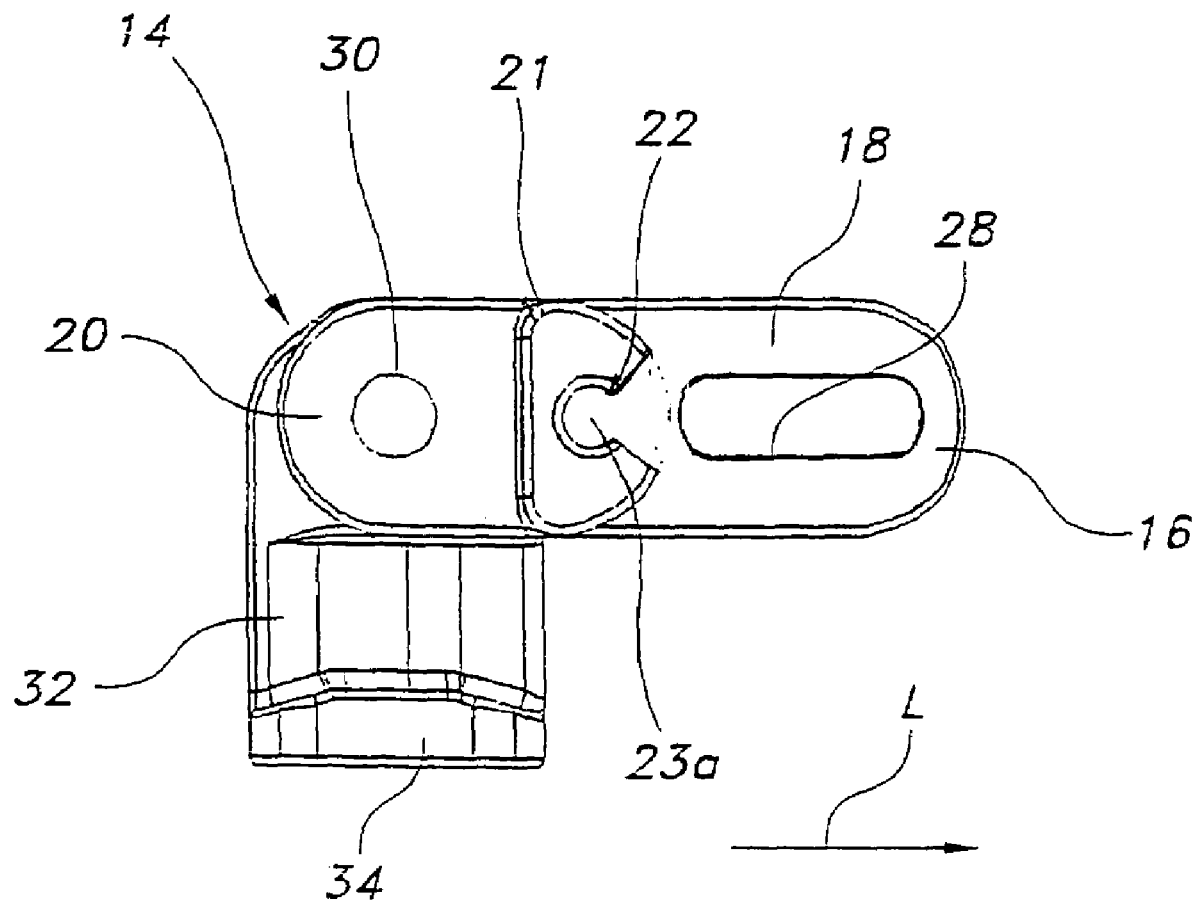
FIG. 9 is a side view of an alternate embodiment.

The foregoing descriptions of various embodiments of the invention are provided for purposes of illustration, and are not intended to be exhaustive or limiting. Modifications or variations are also possible in light of the above teachings. For example, the pocket 22 could be open at each end, in which case the second connector 11b would simply pass through it. Also, the pockets 22 could be constructed with a C-shaped cross-section (see FIG. 9) such that the corresponding end of the second connector 11b is received in snap-fit engagement. The embodiments described above were chosen to provide the best application to thereby enable one of ordinary skill in the art to utilize the disclosed inventions in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A modular link conveyor chain capable of side flexing and including a conveying surface for supporting articles in a conveying direction, comprising:
    a plurality of links arranged in rows spaced apart in the conveying direction, the links in at least a first row including first apertures and the links in at least a second row including second apertures elongated in the conveying direction for aligning with the first apertures when interdigitated with the links in the first row;
    a first connector associated with the first and second apertures to interconnect the first and second rows of links and movable in the conveying direction within at least the second apertures so as to be capable of flexing in a transverse direction and compressing in the conveying direction, the first connector having a dimension A in the transverse direction and forming part of the conveying surface; and
    a second generally parallel connector extending between the links in the first row and also forming part of the conveying surface, the second connector having a dimension B in the transverse direction, wherein A>B.

2. The modular link conveyor chain according to claim 1, wherein each link in the first row includes a pocket having an open end for receiving an end of the second connector and restraining movement of the second connector in the transverse direction.

3. The modular link conveyor chain according to claim 1, wherein each link in the first row comprises an apex portion, a pair of outwardly divergent leg portions, a foot portion associated with each leg portion, and an arm portion including the receiver.

4. The modular link conveyor chain according to claim 3, wherein each link comprises a plurality of apex portions, a plurality of pairs of leg portions, and a plurality of foot portions.

5. The modular link conveyor chain according to claim 3, wherein each link in the second row comprises an apex portion, a pair of outwardly divergent leg portions including the apertures, and a foot portion associated with each leg portion.

6. The modular link conveyor chain according to claim 5, wherein each link in the second row includes an arm portion including a pocket for receiving a third transverse connector.

7. The modular link conveyor chain according to claim 1, wherein A is greater than at least two times B.

8. The modular link conveyor chain according to claim 1, wherein the links in each row are characterized by a depending arm having an inwardly extending tab for assisting in guiding the chain relative to a guide rail.

9. The modular link conveyor chain according to claim 8, wherein the depending aim on each link in the first row includes an opening for receiving a locking tab for retaining the first connector in place.

10. The modular link conveyor chain according to claim 1, wherein the links are made of plastic and the connectors are made of metal.

11. The modular link conveyor chain according to claim 1, wherein the links are made of acetal and the connectors are made of stainless steel, whereby the acetal links are lightweight and provide superior wear resistance while the metal connectors promote cooling of articles being conveyed.

12. A modular link side flexing conveyor chain including a conveying surface for supporting articles being conveyed in a conveying direction, comprising:
- a plurality of plastic guide links arranged in spaced apart rows, each link including at least one aperture having a direction of elongation in the conveying direction;
- a first metal connector rod associated with the apertures of the links in a first row and passing through the links in a second, adjacent row to interconnect the first and second rows of links so as to be capable of moving toward and away from each other in the conveying direction and side flexing in a direction transverse to the conveying direction;
- a second metal connector rod extending between the links in the first row and spaced from the first metal connector rod; and
- a third metal connector rod extending between the first and second connector rods and forming a portion of the conveying surface;
- whereby the first, second, and third metal connector rods facilitate cooling of the articles being conveyed while providing reliable support and without compromising the ability of the chain to side flex.

13. The conveyor chain of claim 12, wherein the first and second connector rods are generally parallel.

14. The conveyor chain of claim 12, wherein the third connector rod moves toward or away from the first and second connector rods during side flexing of the chain.

15. The conveyor chain of claim 12, wherein the third connector rod does not touch the second connector rod during side flexing of the chain.

16. The conveyor chain of claim 12, wherein the links are made of acetal and the connectors are made of stainless steel.

17. The modular link conveyor chain according to claim 16, further including a pocket in each link for receiving and restraining movement of the second connector rod in the transverse direction.

18. A modular link conveyor chain for conveying articles in a conveying direction, comprising:
- first and second modular links, each including at least one apex portion having an aperture with a direction of elongation in the conveying direction, a pair of foot portions, each connected to the apex portion by a leg portion, and a pocket having an open end;
- a first connector interconnecting the first and second links through the apertures; and
- a second connector having a first end positioned in the open end of the pocket of the first link and a second end positioned in the open end of the pocket of the second link such that movement of the second connector in the transverse direction is restrained, and
- a third connector extending between the first and second links.

19. The modular link conveyor chain according to claim 18, wherein the links are made of plastic and the connectors are made of metal.

20. The modular link conveyor chain according to claim 18, wherein at least one of the pockets includes a C-shaped cross-section for restraining movement of the second connector.

21. A modular link for a conveyor chain including a connecting rod, comprising:
- an apex portion having a pair of leg portions extending therefrom, the apex portion including a first aperture passing transversely therethrough, the leg portions each terminating in a foot portion, each foot portion including a second aperture passing transversely therethrough, and at least one arm portion projecting from one of the foot portions, the arm portion including a receiver for receiving an end of the connecting rod so that the connecting rod connects adjacent links;
- wherein the receiver is spaced from both the first aperture and the second apertures in the conveying direction when mounted in the chain.

22. The modular link according to claim 21, wherein the first and second apertures and the receiver are substantially coplanar.

* * * * *